Figure 1:
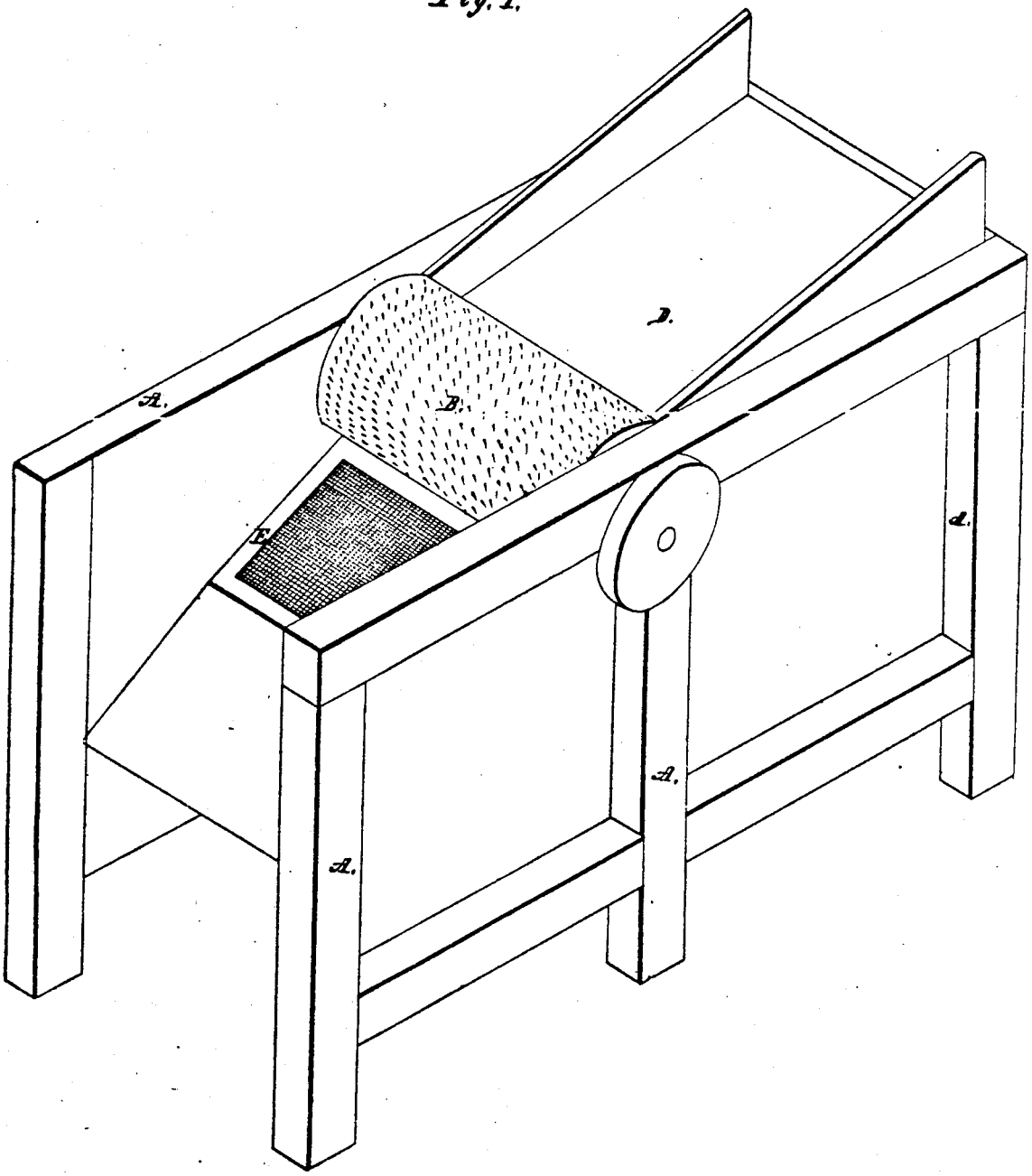
Figure 4:
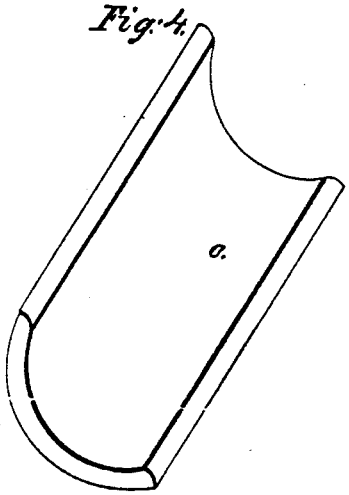
Figure 3:
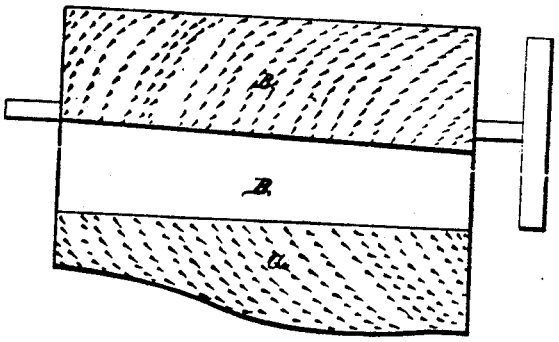
Figure 2:
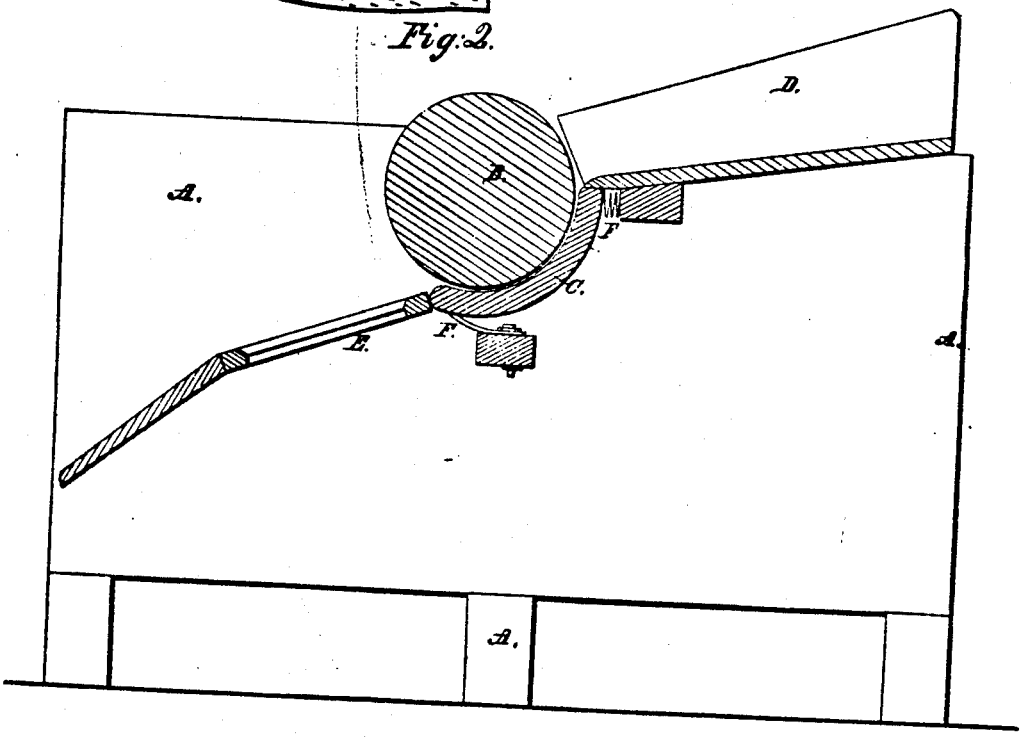

Sheet 1, 2 Sheets.

BEST AVAILABLE COPY

Beck & Jenks.

Cotton Seed Huller.

8547½ X

Patented Dec. 17, 1834.

Sheet 2, 2 Sheets.

8547½ X

Beck & Jenks.
Cotton Seed Huller.

Patented Dec. 17, 1834.

BEST AVAILABLE COPY

H. PETERS, PHOTO-LITHOGRAPHER, WASHINGTON, D. C.